Figure 1:
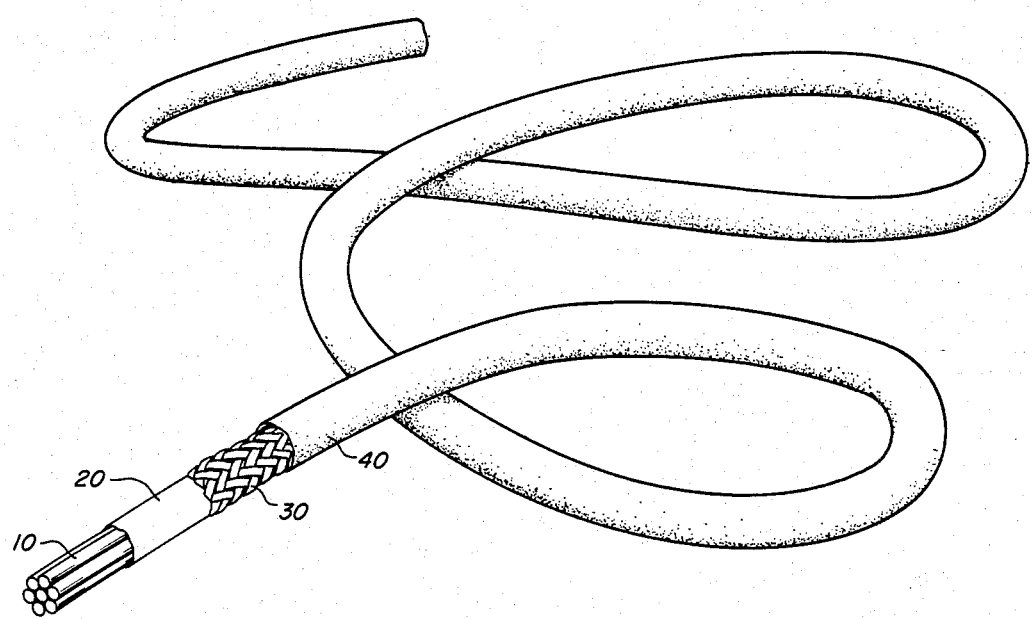

United States Patent [19]

Walsh

[11] Patent Number: 4,522,897

[45] Date of Patent: Jun. 11, 1985

[54] ROPE BATTERIES

[75] Inventor: Myles A. Walsh, Falmouth, Mass.

[73] Assignee: Cape Cod Research, Inc., Buzzards Bay, Mass.

[21] Appl. No.: 541,902

[22] Filed: Oct. 14, 1983

[51] Int. Cl.³ .............................................. H01M 6/34
[52] U.S. Cl. ..................................... 429/119; 429/127
[58] Field of Search ................................. 429/127, 119

[56] References Cited

U.S. PATENT DOCUMENTS

| | | | |
|---|---|---|---|
| 3,007,992 | 11/1961 | Lehovec | 429/127 |
| 3,079,456 | 2/1963 | Pawlak | 429/119 |
| 3,438,816 | 4/1969 | Gruber | 429/127 |
| 3,577,281 | 5/1971 | Pountney et al. | 429/127 |
| 3,928,075 | 12/1975 | Bass | 429/119 |

Primary Examiner—Donald L. Walton
Attorney, Agent, or Firm—Anthony M. Lorusso

[57] ABSTRACT

A flexible, water activated electrochemical cell and battery suitable generally for application in marine devices requiring low power levels for long periods of time without maintenance or replacement is fabricated in the shape of a rope. This novel shape permits extension of the rope battery cells over long distances and greatly increases the rates at which deleterious reaction products can be liberated to the surrounding water and thus greatly improves the efficiency of low drain water activated batteries.

15 Claims, 3 Drawing Figures

ROPE BATTERIES

BACKGROUND OF THE INVENTION

My invention relates to the art of batteries and more particularly to batteries discharged on immersion in salt or fresh water, or other electrolytic medium. While my invention is highly advantageous when embodied in a primary battery having a low discharge rate on immersion in an electrolyte, it is not limited to primary batteries, and secondary batteries made in accordance with the disclosure herein shall be deemed to come within the purview and scope of the invention and to be covered by this application. Batteries used for powering navigational aids, fiber optic communication systems, underwater sensors, underwater beacons, on-the-bottom surveillance buoys and passive underwater target detecting devices should meet the following requirements: (1) have high voltage: (2) be capable of being operated for long periods of time, preferably up to two years, without maintenance or replacement; and, (3) have relatively low cost. Previously known batteries have offered only a compromise between these three factors and have been additionally limited by the requirement that they must fit into the limited stowage space provided within the device itself.

Lithium thionyl chloride batteries in rigid, sealed containers now offer the lowest cost system available for powering deep sea devices, but this cost is extremely high for it is about $10,000 per watt-year of available energy.

Many types and varieties of water activated batteries have been developed and are available. Conventionally the magnesium/silver chloride couple is used in such designs principally for its volumetric compactness, ease of manufacture, and high discharge rate. Various electrochemically active alloys of magnesium, aluminum and/or zinc may alternatively be used as the anode material. Manganese dioxide, lead chloride, silver/cuprous chloride mixtures, cuprous thiocyanate as well as numerous organic halogenating agents may be used to depolarize the cathode. Alternatively a catalytic surface may be provided to evolve hydrogen at the cathode.

All of these types and varieties of water activated batteries are intended and designed to fit into a limited storage space in the form of an essentially rigid battery housing. This housing typically protects the battery cells from mechanical damage and in most cases provides rigid mechanical support for the battery electrodes, separators and electrolyte passages.

There are certain difficulties involved with the heretofore known and applied use of an essentially rigid battery housing for water activated batteries intended for operation for long periods of time. The electrochemical reactions during battery operation produce the deleterious buildup of reaction products on the electrode surfaces. The walls of the rigid housing enclosing the battery combines with the typically compact volumetric design to prevent the escape of these deleterious reaction products to the surrounding waters.

Several means and expedients have been used to attempt to avoid the deleterious buildup of heavy sludge, heat and/or reaction gases on the battery plates. Typically they involve attempting to assure a free and even circulation of electrolyte over the battery plates through pumping and/or through providing passages through the rigid housing for the natural circulation of water through the battery. These, however, are oftentimes expensive and/or tedious and difficult to effectuate rendering them impractical for low rate batteries despite their apparent value.

The basic characteristics and operational principles and limitations of water activated battery design and utilization practice are so widely comprehended by those skilled in the art that further elucidation thereof and elaboration thereon is unnecessary for thorough understanding and recognition of the advance contributed and made possible to achieve by and with the developments of the present invention.

An important object of my invention is to permit primary batteries having a low discharge rate on immersion in an electrolyte to operate for years at a time without suffering deleterious buildup of reaction products.

A further object is to give those skilled in the art of marine equipment design relief from the requirement that water activated batteries must fit into limited, and typically box like, stowage spaces.

Other objects of the present invention will be evident to those skilled in the art from the following detailed description and claims when read in conjunction with the accompanying drawings.

SUMMARY OF THE INVENTION

My invention comprises a novel and unique family of flexible batteries possessing in the preferred embodiment(s) essentially a flexible, electrically conductive inner core surrounded either totally or partially by a flexible inner insulating separator sleeve which is in turn surrounded either totally or partially by a flexible, electrically conductive outer layer. Unlike previously known batteries, my invention can be coiled and uncoiled like a rope.

Any flexible combinations of metals or compositions can be used to provide the electrochemical reactions which will produce the required electrical energy during discharge of the battery, as those skilled in the art will readily understand. And if desired, the core members can also contain flexible strands of electrically conductive material which does not take part in the electrochemical reaction, but assists in the collection of current. It should also be evident that the rope battery need not be circular in cross section, but can have any desired cross section provided that the resulting battery can be coiled and uncoiled like a rope. And, if desired, the outer conductive layer can also be surrounded by a thin flexible plastic insulating sleeve which is typically porous for water activated batteries and provides protection from shunt currents between cells and from mechanical abrasion.

My invention also has within its purview the provision of an operable flexible battery constructed with my novel rope battery as a component thereof, particularly when used as a flexible battery encased in a flexible, non-porous insulating sleeve which is sealed and filled with electrolyte.

ILLUSTRATED REPRESENTATION OF THE INVENTION

Figure 2:
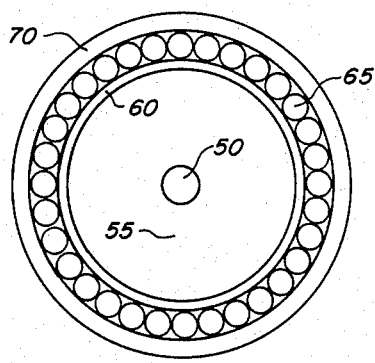
Figure 3:
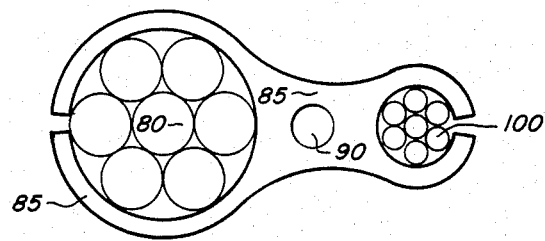

Various embodiments of my invention will now be described by way of example only and with reference to the accompanying drawings in which:

FIG. 1 is a largely simplified and fanciful, exaggerated sketch of a rope battery of the present invention;

FIG. 2 illustrates the cross section of a further embodiment in which the cathode 55 is located in the central core of the rope; and FIG. 3 illustrates the cross section of a further embodiment in which a bundle of corroding metal wires 80 are mechanically separated from the cathode 100 by a flexible, insulating spacer 85.

The anode 10 shown in FIG. 1 is made up of flexible strands of metal alloys which will remain active for anodic dissolution at low anodic current densities for long periods of time, preferably more than two years. Preferred alloys are high purity aluminum having an initial high purity of 99.996% alloyed with between 0.02 and 0.06% by weight gallium to reduce corrosion and 0.5 to 1.2% by weight magnesium to improve strength and ductility. A magnesium alloy suitable for shorter periods of time near the ocean surface carries the designation AZ61 and has the approximate composition, by weight, of 6.5% aluminum, 0.7% zinc and 0.2% manganese, with the remainder magnesium. Zinc can also be used and is preferred for rope batteries that are considered rechargeable, although they cannot be recharged to their original capacity. Zinc also does not produce as many solid and gaseous corrosion products as do magnesium and aluminum anodes and, therefore, may be more suitable in a long-life application.

The porous separator 20 shown in FIG. 1 is thin, flexible and nonconductive. Suitable woven or matted fiberous wrapping materials include: cellulose acetate, glass fiber, polyethylene, polytetrafluoroethylene, polyesters such as Dacron, acrylics such as Orlon and Acrylan, polyacrylonitrile, cellulose products and copolymers of polyvinyl chloride and acrylonitrile such such as Dynel. This list is intended merely by way of illustration and shall not be construed as limiting.

The fibers should be flexible, should not be subject to excessive swelling in the electrolyte and should not be soluble in it.

The cathode 30 shown in FIG. 1 consists essentially of twisted or braided strands of chemically inert metal or graphite. These may be coated with a depolarizer or with a hydrogen evolution catalyst. It is essential that the resulting structure be flexible. Preferably, the cathode comprises woven wire gauze, preforated metal sheet or expanded sheet metal, made of copper, and replacement plated with palladium by immersing the copper in 0.1 g/l $PdCl_2$-0.5 ml/l HCl (38%) at 25° C. Alternatively the cathode can be formed by electrodepositing $MnO_2$ on to graphite fibers or by dipping the supporting strands into a bath of molten lead chloride. This list is intended merely by way of illustration and shall not be construed as limiting.

The protective housing 40 shown in FIG. 1 serves only to mechanically protect and to prevent cell-to-cell shorting should loops touch one another in multicell configurations. For single cell configurations employing hydrogen evolution cathodes this protective housing is unnecessary and is preferably not employed. For other configurations, the housing is porous, thin, flexible and nonconductive. Suitable woven or matted fiberous wrapping materials are essentially the same as those employed for the porous separator 20.

In the arrangement shown in FIG. 2 (which is only one of many forms suitable for use in carrying out my invention) the cathode is found on the inside while the anode 65 surrounds it. This arrangement is preferable for rope batteries using depolarizers rather than merely evolving hydrogen from catalyzed surfaces. The cathode 55 shown in FIG. 2 consists of depolarizer intimately mixed with inert, electrically conductive material to form a dry powder which can be flexed as it is contained within the porous separator 60. Cathode current is collected via a flexible wire 50.

The current collecting wire 50 should not be easily susceptible to corrosion when brought into contact with the depolarizer and/or the electrolyte. A stainless steel alloy which consists mainly of iron and contains at least 10% by weight chromium, between 0.5 to 3.0% by weight molybdenum, and 2 to 15% by weight of nickel is preferred for use in the current collecting wire in rope batteries employing manganese dioxide/acetylene black depolarizer. Silver is preferred for rope batteries employing silver chloride; copper is preferred for rope batteries employing lead chloride/copper flake cathodes. This list is intended merely by way of illustration and shall not be construed as limiting.

The separator 60 may be of any suitable type which is flexible and which will transmit water and ions.

The anode 65 shown in FIG. 2 is made up of flexible strands of metal alloys which remain active for anodic dissolution at low anodic current densities for long periods of time, preferably for more than two years.

The housing 70 is essentially the same as the housing 40.

There are numerous arrangements of flexible anodes, cathodes and separators which when immersed in an electrolyte produce useful electrical power. FIG. 3 illustrates that the rope battery need not be symmetrical around a central axis and also need not employ a porous separator.

The battery of my invention may consist of a single cell, as shown in FIG. 1, or of a plurality of cells which may be connected in parallel, or in a series arrangement.

Those skilled in the art will recognize that a series arrangement involves connecting the anode of one cell to the cathode of the next by means of insulated connecting wires of sufficient length to minimize shunt currents. This arrangement leaves the multicell battery terminals at either end of the multicell rope battery. Since rope batteries may be of considerable length, the central insulated wire 90 is included in FIG. 3 to illustrate the preferred means of returning current from the bitter end terminal in multicell configurations. This wire 90 is flexible and is surrounded by solid plastic insulating material 85 which also serves to house the battery's electrodes.

Others may practice my invention in any of numerous ways which are suggested to one skilled in the art by this disclosure, and all such practice of invention are considered to be a part hereof which fall within the scope of the appended claims.

What is claimed is:

1. A structure for a rope battery employing sea water as the electrolyte comprising a flexible rope which is relatively long compared to its diameter and which consists essentially of a flexible inner core, wherein said inner core comprises at least one continuous, flexible, solid wire, wherein said inner core is surrounded by a thin, porous, flexible insulating separator sleeve which is in turn surrounded by a thin outer flexible layer consisting essentially of twisted, felted or braided strands of metal or graphite, and wherein said inner core consists essentially of corrodible material selected from the group comprising magnesium, aluminum, zinc, and alloys thereof.

2. A rope battery as in claim 1, wherein said flexible separator sleeve consists essentially of a porous layer of paper, cloth, fiberglass, microporous plastic, or other like materials which is permeable to the flow of liquids and gases therethrough.

3. A rope battery as in claim 1, wherein said flexible outer layer consists essentially of twisted or braided strands of metal or graphite which are coated with catalytic amounts of hydrogen evolution catalyst selected from the group comprising platinum, palladium, ruthenium and nickel or alloys thereof.

4. A rope battery as in claim 1, wherein said rope battery is surrounded by a porous, flexible sleeve which is permeable to the flow of liquids and gases therethrough and which mechanically protects the outer layer of twisted, felted or braided strands from damage.

5. A rope battery as in claim 1, wherein said flexible outer layer consists essentially of twisted, felted or braided strands of electrically conductive substrate which is in direct contact with a layer of cathode depolarizer selected from the group comprising manganese dioxide, lead chloride, silver chloride, cuprous/silver chloride, cuprous thiocyanate, or trichloromelamine.

6. A rope battery as in claim 1, wherein said flexible inner core consists essentially of a single flexible solid wire and/or a bundle of small wires of chemically inert material in intimate contact with a mixture of an electrically conductive material and a cathode depolarizer selected from the group comprising manganese dioxide, lead chloride, silver chloride, cuprous/silver chloride, cuprous thiocyanate, or trichloromelamine.

7. A rope battery as in claim 1, wherein said flexible inner core contains a flexible insulated electrical cable for connecting rope single cell batteries together into rope batteries consisting of a plurality of cells connected in series, with said flexible insulated electrical cable running the entire length of the multicell battery and connecting at the bitter end to the terminal electrode.

8. A rope battery as in claim 1, wherein said flexible outer layer consists essentially of twisted, felted or braided strands of corrodible anode material(s) selected from the group comprising aluminum, magnesium, zinc or alloys thereof.

9. A rope battery according to claim 1 comprising a plurality of cells wherein the the ropes are electrically connected together in such a fashion that the anode of one rope battery cell is connected to the cathode of the next cell, with the unconnected electrodes at the bitter ends forming the positive and negative terminals, and with the current returned from one end of the battery to the other by means of an insulated connecting cable.

10. A water activated battery comprising a long flexible rope which consists essentially of two electrically conducting ropes of dissimilar materials held apart by a flexible insulating spacer.

11. A rope battery as in claim 10, wherein one of the two conducting ropes consists essentially of a single flexible solid wire and/or bundle of wires of corrodible material selected from the group comprising magnesium, aluminum and zinc or alloys thereof.

12. A rope battery as in claim 10, wherein one of the two conducting ropes consists essentially of twisted, braided or felted strands of inert metal or graphite which are coated with catalytic amounts of hydrogen evolution catalyst selected from the group comprising platinum, palladium, ruthenium and nickel or alloys thereof.

13. A rope battery as in claim 10, wherein one of the two conducting ropes consists essentially of twisted, braided or felted strands of inert metal or graphite which are in direct contact with a layer of cathode depolarizer selected from the group comprising manganese dioxide, lead chloride, silver chloride, cuprous/silver chloride, cuprous thiocyanate, or trichloromelamine.

14. A rope battery as in claim 10, wherein said flexible insulating spacer contains a flexible insulated electrical cable for passing electrical current from one end of the rope to the other.

15. A rope battery according to claim 10, comprising a plurality of cells connected in series with the battery current returned from the terminal located at the rope's bitter end by means of a flexible insulated electrical cable located within the flexible insulating spacer.

* * * * *